United States Patent [19]

Rowlings

[11] 4,204,785
[45] May 27, 1980

[54] FLUSH DOOR BOLT BORE FORMING JIG

[76] Inventor: James W. Rowlings, P.O. Box 211, Milton, Mass. 02187

[21] Appl. No.: 938,302

[22] Filed: Aug. 22, 1978

[51] Int. Cl.² .............................................. B23B 49/00
[52] U.S. Cl. ..................................... 408/109; 33/189
[58] Field of Search ............... 408/103, 108, 109, 110, 408/115 R, 72 R, 241 S, 705; 33/189, 185 R

[56] References Cited

U.S. PATENT DOCUMENTS

| 481,383 | 8/1892 | Adams | 408/109 X |
| 631,202 | 8/1899 | Dearborn | 408/109 |
| 3,276,326 | 10/1966 | Gibbons et al. | 408/72 X |
| 3,349,652 | 10/1967 | Cromwell | 408/72 X |
| 3,700,344 | 10/1972 | Grumbach | 408/108 |

Primary Examiner—Gil Weidenfeld
Attorney, Agent, or Firm—Clarence A. O'Brien; Harvey B. Jacobson

[57] ABSTRACT

An elongated base structure is provided defining generally right angularly disposed elongated abutment surfaces extending parallelly along a predetermined path disposed in the included angle defined between the abutment surfaces. Abutment structure is carried by one end of the base structure and defines journal structure whose center axis coincides with the aforementioned path. The journal structure is provided for journalling and slidably receiving the shank end of an elongated wood boring drill member therethrough. Further, the base structure includes a clamp portion supported therefrom and opposing and adjustably shiftable toward and away from one of the aforementioned abutment surfaces. Further, an elongated wood boring drill member including a wood boring end and a supportive shank end is provided and the shank end is journalled and slidably received through the journal structure and provided with an abutment on the shank end thereof adjustably shiftably positionable therealong for abutting engagement with the abutment structure remote from the end of the base structure from which the clamp portion is supported.

3 Claims, 4 Drawing Figures

U.S. Patent        May 27, 1980        4,204,785
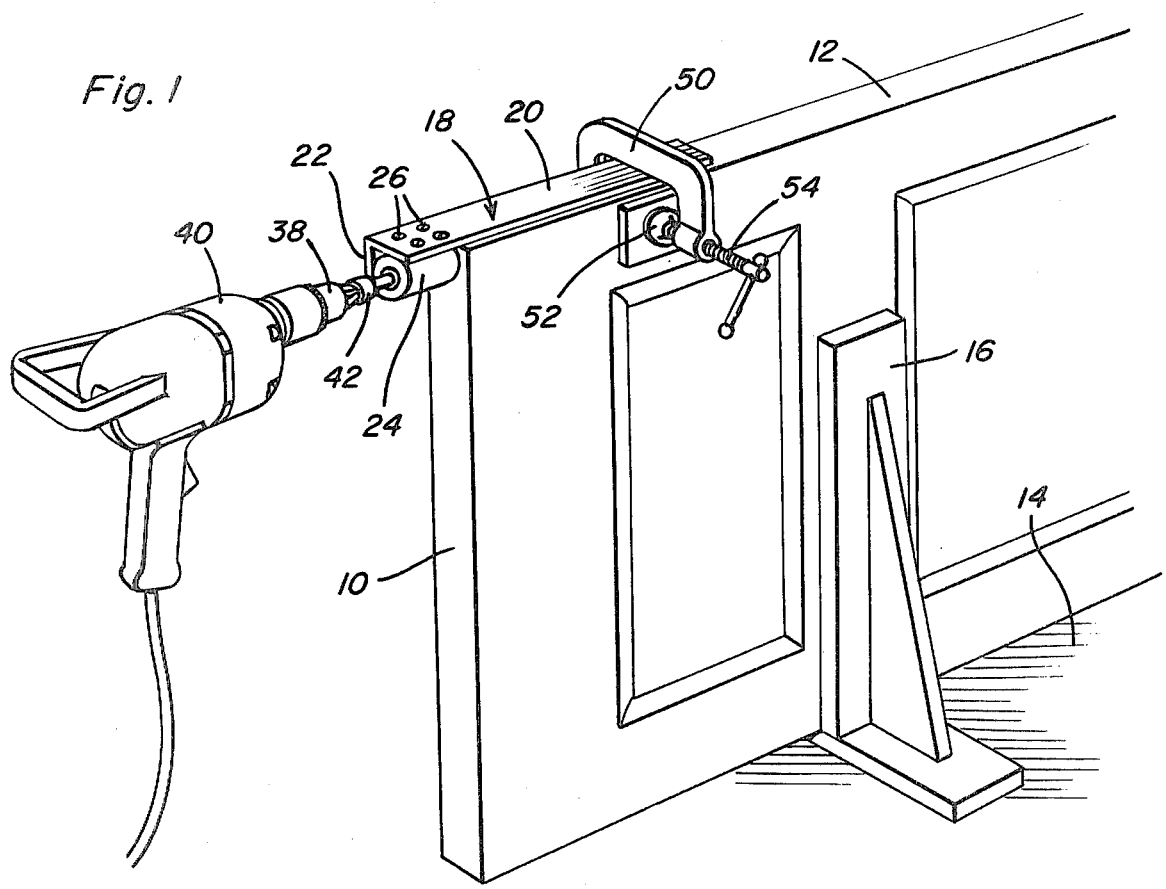
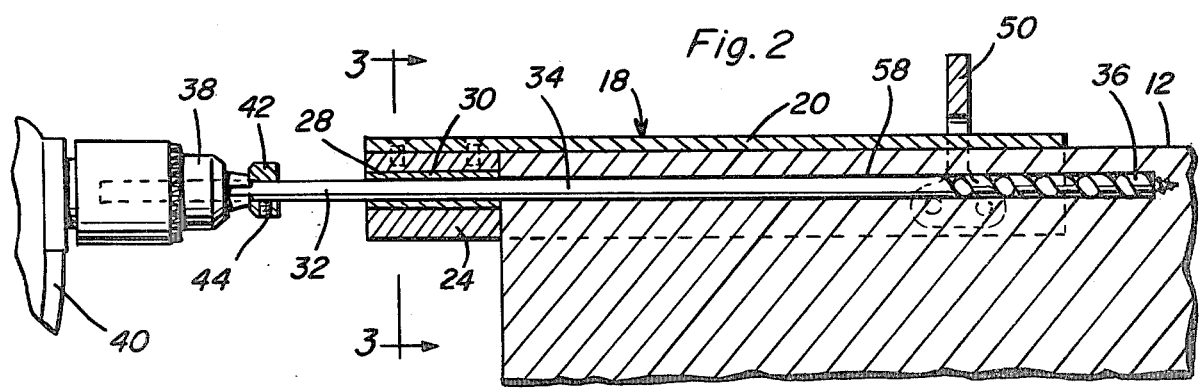
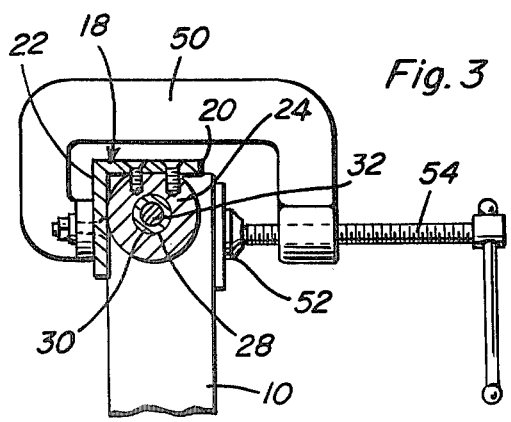
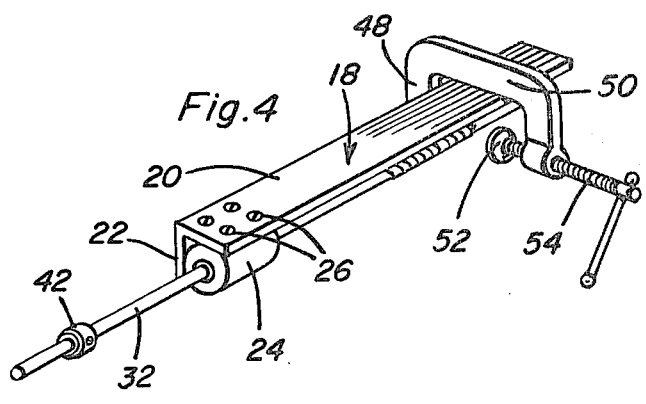

FLUSH DOOR BOLT BORE FORMING JIG

BACKGROUND OF THE INVENTION

When installing a flush bolt in the free swinging edge of a door a bore for slidably receiving the bolt must be formed in the free swinging edge of the door parallelling the free swinging edge and opening through either the top or bottom edge of the door. The required bores may be up to 20 inches in length and difficulty is, therefore, encountered in forming the required bores with the bores being formed maintained in constant spacing relative to adjacent exterior surfaces of the door throughout the length of the bore. Accordingly, a need exists for a guide for guiding a wood boring bit when forming the required bore for a door flush bolt.

Various forms of boring jigs including some which have been designed specifically for use in forming bores in doors have been heretofore provided and are disclosed in U.S. Pat. Nos. 1,233,813, 2,561,914, 2,679,771, 3,362,447, 3,700,344 and 3,999,880. However, these jigs to be used in conjunction with forming bores are not operable in an ultimate manner in forming flush bolt receiving bores in the free swinging edges of doors.

BRIEF DESCRIPTION OF THE INVENTION

The jig of the instant invention comprises an elongated angle member in one end of which an abutment sleeve is secured and a journal sleeve is secured through the abutment sleeve with the center axis of the journal sleeve spaced equally from the flanges of the angle member throughout the longitudinal extent of the flanges. The end of the angle member remote from the abutment sleeve includes clamp structure having an abutment member shiftable toward and away from one of the flanges and the journal sleeve is provided for rotatably and slidably receiving the shank end of a wood boring bit.

The main object of this invention is to provide a jig for the purpose of guiding a wood boring bit in an accurate manner throughout the processes of utilization of the wood boring bit to form a flush bolt receiving bore within the free swinging edge of a door.

Another object of this invention is to provide a jig which may be readily modified in order to center a flush bolt receiving bore formed thereby relative to doors of different thicknesses.

Another important object of this invention is to provide a jig in accordance with the preceding objects and which will be adapted for use in conjunction with various different types of bores.

Yet another object of this invention is to provide a jig in accordance with the preceding objects and constructed in a manner whereby it may be clamped in operative position relative to an associated door.

A final object of this invention to be specifically enumerated herein is to provide a flush door bolt bore forming jig in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is a perspective view of the jig of the instant invention in operative association with a door and a boring bit mounted in the chuck of an electric drill;

FIG. 2 is an enlarged fragmentary vertical sectional view of the assemblage illustrated in FIG. 1 and taken substantially upon a plane passing along the medial plane of the door;

FIG. 3 is a vertical sectional view taken substantially upon the plane indicated by the section line 3—3 of FIG. 2; and FIG. 4 is a fragmentary perspective view of the jig.

DETAILED DESCRIPTION OF THE INVENTION

Referring now more specifically to the drawing, the numeral 10 generally designates a conventional form of door including one edge portion 12 which is to comprise a free swinging edge portion when the door 10 is properly mounted. The door 10 is supported in stationary position relative to a floor surface 14 by means of a door jack 16 and the jig of the instant invention is referred to in general by the reference numeral 18 and is operatively associated with the edge portion 12.

The jig 18 comprises an elongated angle member including integrally formed and right angularly related elongated straight flanges 20 and 22. The flanges 20 and 22 define an inside or included angle in one end of which a generally cylindrical abutment block 24 is removably secured by means of suitable fasteners 26 secured through the flange 20 and threadedly engaged in the abutment block 24. The block 24 includes a longitudinal bore 28 formed therethrough which parallels the flanges 20 and 22 and is spaced equally from the latter throughout their length. The bore 28 has a journal sleeve 30 secured therein and the journal sleeve 30 rotatably and slidably receives the shank end portion 32 of a wood boring bit 34 including a wood boring end 36 remote from the shank end 32.

The shank end 32 of the wood boring bit 34 is secured within the chuck 38 of an associated electric drill 40 and an annular abutment 42 is rotatably and slidably received on the shank end portion 32 and includes a set screw 44 whereby the annular abutment 42 may be secured in adjusted shifted position along the shank end portion 32.

The end of the angle member remote from the abutment block 24 has one jaw end 48 of a C-clamp 50 supported from the outer side of the flange 22 and the abutment 52 carried by the clamp screw 54 of the C-clamp 50 opposes the inner side of the flange 22 and is adjustably shiftable toward and away from the flange 22. Accordingly, the clamp screw 54 may be utilized in clamping the jig 18 in stationary position relative to the edge portion 12 of the door 10 in the manner illustrated in FIGS. 1 and 2 of the drawing and with the wood boring end 36 of the bit 34 rotatably and slidably received through the journal sleeve 34. After the jig 18 has been mounted relative to the door 10 in the manner illustrated in FIGS. 1 and 2 of the drawing, the electric drill 40 may be utilized to rotate the bit 34 and the latter may be forwardly advanced through the journal sleeve 30 whereby the wood boring end 36 of the bit 34 will form the desired bore 58 in the edge portion 12 of the door 10. Of course, inasmuch as the longitudinal center axis of the journal sleeve 30 parallels the flanges 20 and 22 and the bit 34 is of rigid material, forward advancement of the bit 34 through the door 10 in order to form the bore 58 in parallelly relation relative to the edge portion 12 and the adjacent opposite sides of the door 10 is assured.

If the jig 18 is to be utilized in conjunction with a door considerably thicker than the door 10, the abutment block 24 may be removed and replaced by an abutment block of larger diameter in order to space the center axis of the journal sleeve of the larger abutment block a greater distance from the side of the door 10 against which the flange 22 is abutted and thereby maintain the bore to be formed in the wider door substantially centered between the opposite side faces of the door.

The annular abutment 42 may be adjusted in position along the bit 34 in order to limit penetration of the bit 34 into the door 10 and thus the length of the desired bore 58.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the inventon.

What is claimed as new is as follows:

1. A jig for use in drilling a bore along the free swinging edge of a door intermediate the opposite sides thereof, said jig including an elongated right angle member defining substantially right angularly disposed elongated abutment surfaces extending parallelly along a predetermined path disposed in the included angle defined between said surfaces, elongated abutment structure carried by one end of said angle member and defining a journal structure whose center axis coincides with said path, said journal structure being mounted between said surfaces and adapted to journal and slidably receive therethrough the shank end of an elongated wood boring drill member and the other end of said angle iron including clamp means supported therefrom opposing and adjustably shiftable toward and away from one of said surfaces, whereby the door can be clamped between the clamp means and said one of said surfaces.

2. The combination of claim 1 wherein said abutment structure comprises an abutment block supported from said one end of said angle member within said included angle and having a bore formed therethrough concentric with said path, said journal structure comprising a journal sleeve secured in said bore.

3. The combination of claim 2 including a stop member for mounting on said shank end and adjustably shifting therealong, said stop member including means releasably retaining said stop member in adjusted position on said shank end, said stop member being abuttingly engageable with the side of said block remote from said other end of said base structure for limiting shifting of said drill member through said journal toward said other end of said angle member.

* * * * *